H. D. CHURCH.
MOTOR VEHICLE.
APPLICATION FILED DEC. 9, 1912.
1,158,638.
Patented Nov. 2, 1915.
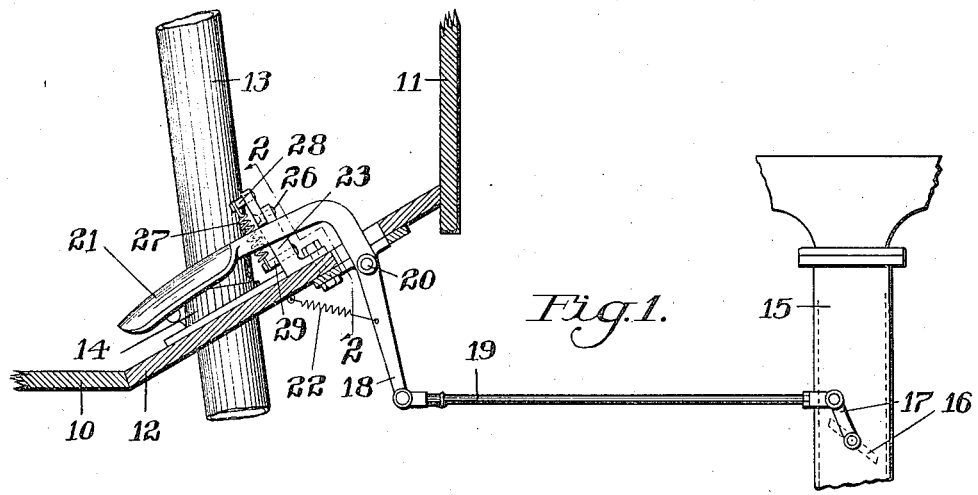
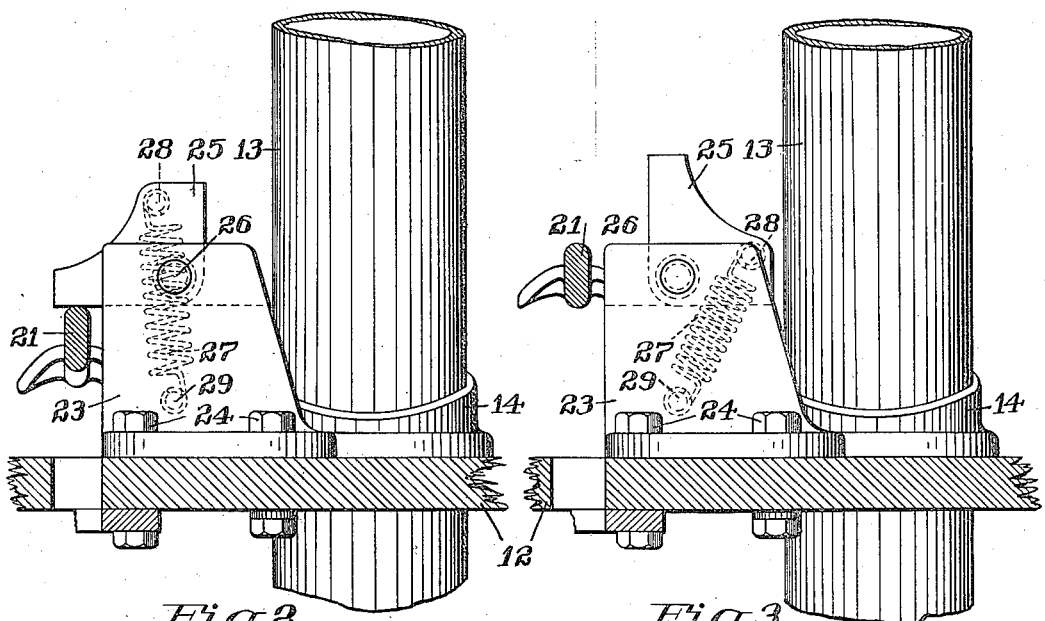
WITNESSES
Milo L. Bailey
INVENTOR
Harold D. Church.
by
Milton Tibbetts,
Attorney

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,158,638.      Specification of Letters Patent.      Patented Nov. 2, 1915.

Application filed December 9, 1912. Serial No. 735,731.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles, and particularly to the motor control devices.

One of the objects of the invention is to simplify the motor control mechanism, and thereby eliminate complication and reduce the cost of manufacture.

The invention comprises a pedal lever connected to the motor throttle and forming the sole operating device for said throttle, in combination with a latch, or other suitable device, for holding the pedal in a given predetermined position against the action of its retracting spring. By this arrangement, the parts can be so adjusted that the latch will hold the pedal lever so that the motor throttle is in the most advantageous position for starting, and if desired, the latch may be used to hold the pedal lever in the same position to run the motor at a given speed.

The invention will be described in connection with the drawings, which form a part of this specification, and in which, Figure 1 is a side elevation of a portion of a motor vehicle, with parts in section, showing one embodiment of this invention; Fig. 2 is an enlarged transverse section approximately on the line 2—2 of Fig. 1, looking toward the rear of the vehicle; and Fig. 3 is a view similar to Fig. 2, showing the latch in inoperative position.

Referring to the drawings, 10 represents the body of the vehicle, which also includes the dash 11 and the inclined floor-board 12, through which the steering column 13 projects and is steadied in the bracket 14. Mounted on the vehicle in front of the dash 11, is the motor, of which the intake pipe 15 is shown in the drawing. In the intake pipe is the motor throttle 16, shown in dotted lines, which throttle is operated by an arm 17 and a pedal lever 18 through a connecting rod 19. The pedal lever 18 is pivotally supported at 20 on the inclined floor-board, or other part of the vehicle, and the arm 21 of said pedal lever extends inside the vehicle and in proximity to the inclined floor-board 12, for convenient operation by the foot of the operator. The pedal lever is preferably held in its retracted position, in which the throttle 16 is very nearly closed, by means such as a spring 22. In this position, the motor idles without load, and the throttle is opened and closed by the operator solely through this pedal lever 18.

With the above described construction, it is evident that the throttle will remain very nearly closed, except when pressure is applied to the arm 21, so that it would be very difficult to start the motor by hand cranking if some means were not provided for opening the throttle to a greater degree. The present invention embodies a device for this purpose, which include spring means operating directly upon the pedal lever 18 to hold it in a predetermined position.

A bracket 23 is mounted adjacent the arm 21 of the pedal lever 18, and it is shown as secured to the floor-board 12 by bolts 24, and as an integral part of the bracket 14, which tends to maintain the steering column 13 in position. The bracket 23 supports a latch 25, shown as pivoted to the support at 26 in a slot formed to receive the latch, and the latch is yieldingly held in either of two positions by a spring 27, shown in full lines in Fig. 1 and in dotted lines in Figs. 2 and 3. This spring is secured to the latch at 28, and to the bracket 23 at 29, and in the operative position of the latch, as shown in Fig. 2, the spring is on one side of the pivot 26, and in the inoperative position, as shown in Fig. 3, the spring is on the other side of said pivot.

As shown particularly in Fig. 2, a portion of the latch 25 extends beyond the bracket 23 and into the path of the arm 21, and thereby holds said arm in partly depressed position. When the latch is moved to its inoperative position, as shown in Fig. 3, the arm 21 is released and may then return to its fully retracted position.

It will be understood that the latch 25 is so positioned and is so formed that it may be moved from either position to the other by the foot of the operator in conjunction with his operation of the pedal lever 18.

Various modifications of the invention may be made without departing from the spirit or scope thereof.

Having thus described my invention, what I claim and desire to secure by Letters Patent, is,

1. In a motor vehicle, the combination with a motor, a pedal, control mechanism operated thereby, and means tending to yieldingly hold said mechanism in one position, of means normally inactive and mounted independently of but adjacent said pedal for yieldingly securing said control mechanism in a predetermined position.

2. In a motor vehicle, the combination with a motor, a pedal, throttle control mechanism operated thereby, and means tending to yieldingly hold said mechanism in one position, of means normally inactive and mounted adjacent said pedal for yieldingly securing said pedal in a predetermined position in opposition to said first means.

3. In a motor vehicle, the combination with a motor, a pedal, throttle control mechanism positively operated thereby, and means tending to yieldingly hold said mechanism in one position, of means normally inactive and mounted independently of but adjacent said pedal for securing it in a predetermined position in opposition to said first means.

4. In a motor vehicle, the combination with the floor-board, the motor, control mechanism therefor, spring means adapted to yieldingly hold said mechanism in one position, a pedal mounted on said floor-board and operating said control mechanism, of means mounted independent of but adjacent said pedal and adapted to act directly upon said pedal for yieldingly securing it in a predetermined position.

5. In a motor vehicle, the combination with the floor-board, the motor, spring operated control mechanism therefor, a pedal for operating said control mechanism, and normally inactive spring means for yieldingly securing said pedal in a predetermined position.

6. In a motor vehicle, the combination with the floor-board, the steering column, a support therefor, a pedal for operating said control mechanism, and spring means tending to hold said mechanism in one position, of spring means for yieldingly securing said pedal in a predetermined position in opposition to said first means, and a mounting for said pedal securing means, said mounting being integral with said steering column support.

In testimony whereof I affix my signature in the presence of two witnesses.

HAROLD D. CHURCH.

Witnesses:
 RUSSELL HUFF,
 LE ROI F. WILLIAMS.